United States Patent
Taki et al.

(10) Patent No.: US 7,176,510 B2
(45) Date of Patent: Feb. 13, 2007

(54) THIN FILM CAPACITOR

(75) Inventors: Kenji Taki, Kyoto (JP); Tetsuya Kishino, Kyoto (JP)

(73) Assignee: Kyocera Corporation, Kyoto (JP)

( * ) Notice: Subject to any disclaimer, the term of this patent is extended or adjusted under 35 U.S.C. 154(b) by 44 days.

(21) Appl. No.: 10/950,178

(22) Filed: Sep. 24, 2004

(65) Prior Publication Data

US 2006/0011961 A1 Jan. 19, 2006

(30) Foreign Application Priority Data

Sep. 26, 2003 (JP) .......................... P2003-336273

(51) Int. Cl.
*H01L 29/76* (2006.01)
*H01L 21/00* (2006.01)
*H01G 4/00* (2006.01)

(52) U.S. Cl. .................. 257/295; 438/3; 381/301; 381/305

(58) Field of Classification Search ............. 257/295; 438/3; 361/301, 305
See application file for complete search history.

(56) References Cited

U.S. PATENT DOCUMENTS

| | | | | |
|---|---|---|---|---|
| 5,248,564 | A * | 9/1993 | Ramesh ...................... | 428/688 |
| 6,346,859 | B1 * | 2/2002 | Saitou ........................ | 330/286 |
| 6,803,617 | B2 | 10/2004 | Baniecki et al. | |
| 6,876,536 | B2 * | 4/2005 | Sakashita et al. ............ | 361/311 |
| 6,891,714 | B2 * | 5/2005 | Sakashita ................... | 361/306.3 |
| 2004/0193670 | A1 * | 9/2004 | Langen et al. ............... | 708/819 |

FOREIGN PATENT DOCUMENTS

| | | |
|---|---|---|
| JP | 11-260667 | 9/1999 |
| JP | 2003-209179 | 7/2003 |

OTHER PUBLICATIONS

Su et al., Thin film Bulk Acosustic Resonators and Filters Using ZnO and Lead _Zirconiu- Titanate Thin Films , IEEE Transactions on Microwave Theory and Techniques, vol. 49, No. 4 Apr. 2001, pp. 769-778.*
Seo K et al. , The Modeling of thin_Fllm Bulk Acoustic Wave Resonators Using the FDTD Method. , IEEE Electron Device Latters, vol. 23, No. 6, Jun. 2002.*

(Continued)

*Primary Examiner*—Long Pham
*Assistant Examiner*—Shrinivas H. Rao
(74) *Attorney, Agent, or Firm*—Hogan & Hartson LLP (57) ABSTRACT

A thin film capacitor includes a pair of electrodes and a dielectric layer having piezoelectricity sandwiched therebetween. The phase characteristic of an impedance resulting from application of a voltage to the pair of electrodes peaks periodically according to a frequency of a signal to be inputted or outputted. The frequency of the signal is adjusted to fall in between the values representing the adjacent peaks. Since there are periodic peak values that depend upon the frequency of the inputted or outputted signal, in fabricating a band-pass filter, a higher attenuation can be attained by ensuring that the peak value stands at a low-frequency level. Thus, a higher attenuation can be attained at low frequencies without sacrificing the band-pass characteristic, whereby making it possible to produce a band-pass filter that is excellent in band-pass characteristic.

5 Claims, 4 Drawing Sheets

OTHER PUBLICATIONS

Text Book- "Thin Film Materials Technology" Sputtering Of Compound Materials Kiyotatka Wasa etal. pp. 236-239, (2004 Edn,).*
Lakin et al. Thin Film Resonators and Filters, 1999 IEEE Ultrasonics symposium-895 906.*

Tappe, et al., Electrostrictive Resonances in $(Ba_{0.7}Sr_{0.3})TiO_3$ Thin Films At Microwave Frequencies.

* cited by examiner

FIG. 7

THIN FILM CAPACITOR

BACKGROUND OF THE INVENTION

1. Field of the Invention

The present invention relates to a thin film capacitor constituted with use of a high-dielectric-constant thin film, for example, a variable capacitor for voltage-controlling electrostatic capacitance by exploiting the dependence on an applied voltage of a dielectric constant in a dielectric layer formed of a high-dielectric-constant thin film, and more particularly, to a variable capacitor that operates at high frequencies with a low dielectric loss irrespective of voltage application. The invention relates also to a thin film capacitor constituted with use of a high-dielectric-constant thin film designed for use in power-source decoupling in a semiconductor integrated circuit.

2. Description of the Related Art

The higher the frequency for use in operations of wireless communication systems, electric circuits, or the like, the greater the demand for electronic components that operate at increasingly high frequencies in response to electric signals. In particular, when a thin film capacitor is used as a constituent component for a filter or resonator in a high-frequency circuit, the capacitor is required to provide a high quality factor (Q factor=1/tan δ). Moreover, in keeping with advancement and changeover to newer models in wireless communication technique, communication apparatuses adaptable to a plurality of transmission/reception systems have come to be increasingly demanded. In order to satisfy many requirements such as the demand for adaptability to a plurality of transmission/reception systems; reduction in the number of constituent components; and miniaturization, in recent years, development of variable elements such as voltage variable filters and voltage variable capacitors has been under way (for example, refer to Japanese Unexamined Patent Publication JP-A 11-260667 (1999)).

A voltage variable capacitor is a thin film capacitor in which a great dielectric constant variation resulting from voltage application to a high-dielectric-constant thin film is utilized. For example, the voltage variable capacitor is composed of a substrate; a lower electrode made of a metal thin film formed on the substrate; a high-dielectric-constant thin film formed on the lower electrode; and an upper electrode formed on the high-dielectric-constant thin film. As a material for forming the high-dielectric-constant thin film, a dielectric substance having a perovskite crystal structure has been used, for example, strontium titanate ($SrTiO_3$); barium strontium titanate ($Ba_xSr_{1-x}Ti_yO_3$, hereinafter abbreviated to "BST" on occasion); and lead zirconate titanate ($Pb(Zr_xTi_{1-x})O_3$). It has been known that a perovskite-type oxide such as $SrTiO_3$ or BST exhibits a high dielectric constant at about ambient temperature, and exhibits the highest dielectric constant in a composition given as: $Sr/(Sr+Ba)=0.3$, which is close to the boundary of cubic-tetragonal structural transformation in the perovskite crystal structure. Particularly, $SrTiO_3$—$BaTiO_3$ solid solution-based materials characterized by exhibiting a paraelectric phase at ambient temperature have been briskly developed, because they are ideally suited for applications in DRAM that requires high dielectric property and nonvolatile RAM that utilizes ferroelectricity. Moreover, a dielectric thin film made of such a material undergoes nonlinear dielectric-constant changes by applying a predetermined voltage thereto. In view of this, such a dielectric thin film has been regarded as suitable for variable capacitors. Further, it has been adopted for thin film capacitors designed for use in power-source decoupling in semiconductor integrated circuits that are required to meet the demands for miniaturization and large electrostatic capacitance (for example, refer to Japanese Unexamined Patent Publication JP-A 2003-209179).

The requirements to be satisfied by a variable capacitor employing such a high-dielectric-constant thin film having the above-described perovskite crystal structure are: high tunability; high Q factor; low temperature coefficient, preferably 0 ppm/° C.; high electrical strength; high insulation resistance; low distortion property; and freedom from secular change. The high tunability indicates variance in the variable capacitor. Given before-voltage-application capacitance of $C_0$ and after-voltage-application capacitance of $C_1$, then the tunability is expressed as: $(C_0-C_1)/C_0 \times 100$ (%), for example. Since the tunability is higher as electric field intensity is greater, it follows that, the smaller the thickness of the dielectric thin film, the higher the tunability. The Q factor is dependent upon a loss caused in each of the constituent components of the capacitor. Mainly, a dielectric loss associated with a dielectric substance and a conductor loss associated with an electrode are responsible for Q factor reduction. The capacitance and Q factor of the thin film capacitor can be obtained through impedance measurement.

The inventors of the application conducted impedance measurement on a thin film capacitor employing BST for forming a dielectric thin film. As a consequence, it has been observed that, after voltage application, the phase characteristic varies periodically with respect to frequencies (refer to FIG. 1). In FIG. 2, the measurement result is shown in terms of the Q factor. As seen from the graph, there is a tendency that a before-voltage-application Q factor (thick line) decreases monotonously, whereas an after-voltage-application Q factor (thin line) decreases periodically with respect to frequencies.

The periodic variations of the phase characteristic and Q factor with respect to frequencies are ascribable to great piezoelectricity exerted by the high-dielectric-constant thin film employed in the thin film capacitor after voltage application. That is, as the piezoelectricity becomes greater by voltage application, the dielectric thin film is excited to cause a thicknesswise longitudinal vibration by the applied high frequency, which results in appearance of a resonant characteristic based on a thicknesswise longitudinal fundamental vibration or harmonics. The resultant resonant frequency is dependent upon the thickness or configuration of a film.

In connection with such characteristics, there are two problems to be solved by the invention. The first problem is that, in fabricating a band-pass filter with use of a thin film capacitor in which the Q factor decreases monotonously with respect to frequencies as shown in FIG. 2, for example, a desired attenuation at low frequencies cannot be fulfilled without sacrificing the band-pass characteristic (Loss).

The second problem is associated with a case where a thin film capacitor employing a high-dielectric-constant thin film having the above-stated perovskite crystal structure is used as a variable capacitor.

Essentially, it is preferable that a high-dielectric-constant thin film to be employed in a variable capacitor exhibits no piezoelectricity and a range of operation temperatures thereof is Curie temperature or higher. The high-dielectric-constant thin film is preferably made of a material that exhibits paraelectricity within the range of operation temperatures. When the material exhibits ferroelectricity, it is not suited for the variable capacitor. This is because, with ferroelectricity, capacitance variations are attended with hysteresis by voltage application, and thus the capacitance is dependent upon electric-field hysteresis. Furthermore, the hysteresis corresponds to a lag behind a polarized alternating current, that is; a high dielectric loss. For these reasons, BST-based materials that exhibit paraelectricity within the range of operation temperatures (ca. ambient temperature) have hitherto been widely used for a high-dielectric-constant thin film to be employed in a variable capacitor.

The $SrTiO_3$—$BaTiO_3$ solid solution-based material exhibits ferroelectricity or paraelectricity according to its composition given by: Ba/Sr or Ti/(Ba+Sr). The composition is generally so determined that a paraelectric phase region may be kept within the range of operation temperatures. However, there is a possibility that the ferroelectricity of $BaTiO_3$ appears in an abated state in a paraelectric-ferroelectric phase boundary region, which may lead to slight capacitance hysteresis.

In order to satisfy many requirements as described hereinabove, such a phase boundary region-based material may be desirable. However, what matters here is piezoelectricity derived from the ferroelectricity. The piezoelectricity is intensified by a voltage applied to vary the capacitance, which may result in occurrence of resonance in the impedance's amplitude and phase characteristics. The resultant resonant frequency is, in a variable capacitor composed of a pair of electrodes and a dielectric layer held therebetween, dependent upon each layer's film thickness and electrode size. At the periodic resonant frequency, there arise capacitance variation and Q factor reduction. The influence thereof will be problematic when it is notable within the range of usable frequencies set for the variable capacitor. That is, in the variable capacitor characterized in that the phase characteristic varies periodically by voltage application, the resultant resonance exerts an influence within the range of usable frequencies. In a case where the variable capacitor in which the Q factor is greatly reduced after voltage application is employed as a constituent component for a filter, a resonator, or the like, inconveniently, a loss that the variable element incurs increases by voltage application.

In course of the development of such a thin film capacitor in which the dependence on a voltage of the dielectric constant of the high-dielectric-constant thin film is exploited, the above-described findings and problems pertinent to voltage application have been unknown to date until the inventors of the present application had confirmed.

SUMMARY OF THE INVENTION

The invention has been devised in view of the two problems stated hereinabove, and accordingly its first object is to provide a thin film capacitor which is so designed that, in a case of fabricating a band-pass filter therewith, a desired attenuation can be fulfilled without adjusting a circuit constant. A second object of the invention is to provide a variable capacitor in which Q factor reduction resulting from voltage application can be minimized at a predetermined frequency. Yet another object of the invention is to provide a variable filter or the like in which insertion loss and phase characteristic variation can be minimized successfully by using such a variable capacitor.

The invention provides a thin film capacitor comprising:
a pair of electrodes; and
a dielectric layer sandwiched between the electrodes,
wherein a phase characteristic of an impedance resulting from voltage application to the pair of electrodes peaks periodically according to a frequency of a signal to be inputted or outputted.

In the invention, it is preferable that the frequency of the signal (usable frequency) is adjusted to fall in between values representing adjacent peaks.

In the invention, it is preferable that a resonant frequency $f_n$ is roughly given by: $f_n = nV/2t$ (n=1, 3, 5 . . . ), in which t is an entire film thickness, i.e. the sum of the thicknesses of the dielectric layer and the pair of electrodes for constituting a piezoelectricity-influenced oscillatory portion and V is an effective sonic velocity of a sonic wave propagating through the oscillatory portion, and the resonant frequency is so adjusted as not to fall within the range of the signal frequencies.

In the invention, it is preferable that the dielectric layer is made of a perovskite-type oxide dielectric substance.

In the invention, it is preferable that the dielectric layer is made of $(Ba, Sr) TiO_3$.

In the invention, it is preferable that an insulating layer is so formed as to cover the pair of electrodes and the dielectric layer.

In the invention, it is preferable that the pair of electrodes each have an electrode terminal, and that a protective layer is formed in such a way that part of the electrode terminal is exposed.

Now, reference will be made particularly to a thin film capacitor that employs a high-dielectric-constant thin film so as to allow a capacitance to vary by voltage application, more specifically, a thin film capacitor characterized in that its dielectric thin film exhibits piezoelectricity (with periodic peaks) upon reception of an alternating voltage under the condition that a direct-current voltage is applied; that an oscillation, predominantly a thicknesswise longitudinal vibration, appears periodically with respect to a frequency by voltage application; and that the phase characteristic of an impedance varies periodically with respect to frequencies, and the intensity and cycle of the variation are changed by the applied voltage. In constituting such a thin film capacitor, in order to inhibit the Q factor from decreasing due to the periodic variation of the impedance phase characteristic with respect to frequencies, materials in use and layer configuration are carefully selected and adjusted in such a way that the range of usable frequencies may be limited to values falling in between adjacent resonant frequencies. The adjustment and selection as to materials and layer configuration are made with consideration given to each layer's film thickness; sonic velocity; and acoustic impedance, under the assumption that the thin film capacitor is constructed as a parallel plate (overlay) type capacitor as will be described layer by way of embodiment, or an MIM (Metal Insulator Metal) capacitor, and that a piezoelectric oscillation takes place in a thicknesswise longitudinal vibration mode.

Figure 3:
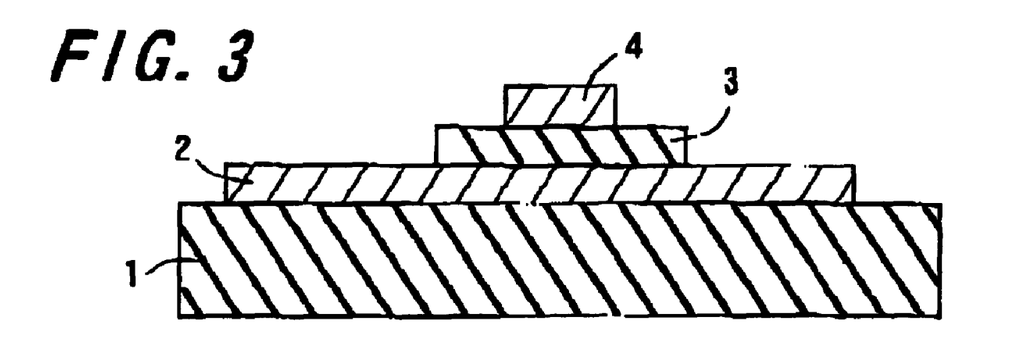
FIG. 3 is a sectional view of assistance in schematically explaining an overlay type capacitor.

For example, as shown in FIG. 3, the construction under discussion includes an upper electrode 4 and a lower electrode 2 that are respectively disposed on a substrate 1. The lower electrode 2 is formed on one thicknesswise principal surface of a high-dielectric-constant thin film 3, whereas the upper electrode 4 is formed on the other thicknesswise principal surface of the high-dielectric-constant thin film 3 to face the lower electrode 2. In this construction, an oscillation thereof takes place mainly in the thicknesswise longitudinal vibration mode, and the resonant frequency is determined by each layer's film thickness, sonic velocity, acoustic impedance, and other factors.

Figure 4:
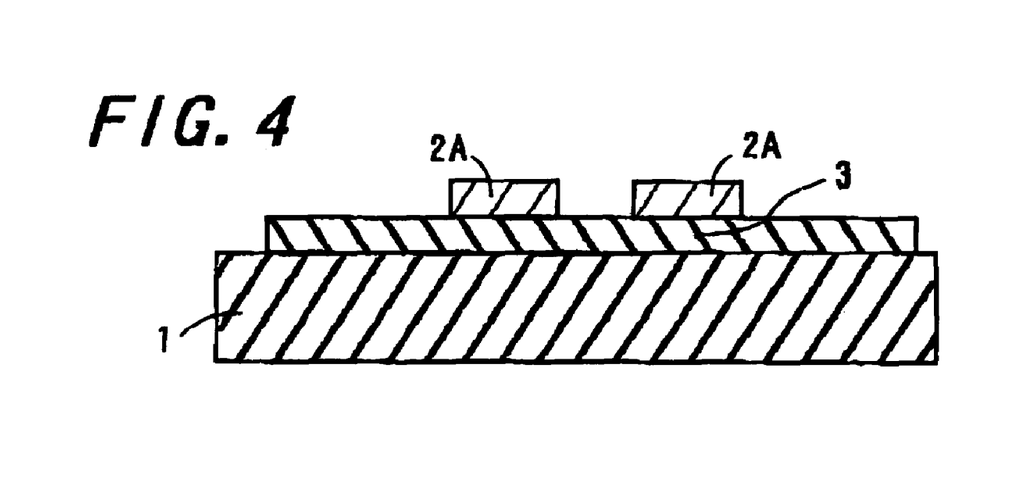
FIG. 4 is a sectional view of assistance in schematically explaining a gap type capacitor.

In the invention, the construction is not limited to the overlay type capacitor, but may be of a variable capacitor of another type such as a gap capacitor or a comb-shaped electrode capacitor. The gap capacitor is so designed that two pieces of electrodes 2A are disposed on the same, common surface of the high-dielectric-constant thin film 3 (refer to FIG. 4). In this case, resonance takes place in a different vibration mode as a matter of fact, and correspondingly various setting values are adjusted in accordance with the configuration and vibration mode of the construction. In sum, in constituting a thin film capacitor typified by the variable capacitor employing a high-dielectric-constant thin film in which the capacitance varies by voltage application, by determining materials and layer configuration properly, it is possible to prevent the Q factor from being greatly reduced by voltage application due to resonance induced by the piezoelectricity of the dielectric substance in use, and thereby maintain the Q factor sufficiently high at a usable frequency (high frequency, in particular).

Hereinbelow, a description will be given as to a stacked-type variable capacitor having the advantage of relative easiness of setting, in which a piezoelectric oscillation takes place mainly in the thicknesswise longitudinal vibration mode. A fundamental wave $f_1$ for this vibration mode is determined by the thickness of a high-dielectric-constant thin film; the film thicknesses of electrodes having sandwiched therebetween the high-dielectric-constant thin film; and the sonic velocity and acoustic impedance of a material in use. Assuming that t is the entire thickness of the structure constituting an oscillatory portion including the electrodes, and that V is the effective sonic velocity of a sonic wave propagating through the oscillatory portion, then $f_1$ is given by: $f_1=V/2t$, while a higher-order resonant frequency $f_n$ is roughly given by: $f_n=nV/2t$ (n=1, 3, 5 . . . ). The effective sonic velocity refers to the average of sonic velocities that differ according to materials used to form the individual layers, when viewed in the oscillatory portion as a whole. The material and film thickness are so determined that each of the resonant frequencies does not fall in the range of usable frequencies. The desired film thickness is determined by the usable frequency and the effective sonic velocity as seen in the oscillatory portion. The fundamental wave can be shifted to a high-frequency level by reducing the film thickness or by increasing the effective sonic velocity. It is preferable that the film thickness is so adjusted that the fundamental wave is beyond the range of usable frequencies. This makes it possible to avoid the influence of resonance on the Q factor at the time of voltage application. In this way, according to the invention, materials in use and film thickness are preferably so determined as to minimize Q factor reduction resulting from voltage application at a predetermined frequency.

Next, the setting of acoustic impedance will be explained. At an interface between layers of different acoustic impedances, part of an oscillatory wave is reflected, but the remainder thereof is transmitted therethrough. This results in occurrence of resonance for the reflected oscillatory wave and resonance for the transmitted oscillatory wave. Accordingly, in the setting of acoustic impedance, containment of vibrational energy is achieved in the pair of electrodes and the dielectric thin film, and acoustic isolation is effected in the other layers; wherefore unnecessary excitation can be avoided. In this way, according to the invention, the acoustic impedance of each of the materials and film thickness are so determined as to minimize Q factor reduction resulting from voltage application at a predetermined frequency. In the invention, the thin film capacitor preferably ranges in usable frequency from 1.7 to 2.1 GHz. This frequency range applies to cellular mobile phones, for example. It is thus preferable to see to it that Q factor reduction resulting from voltage application is avoided within the usable frequency range.

The thin film capacitor of the invention is composed of a pair of electrodes and a dielectric layer sandwiched between these electrodes. In this construction, the phase characteristic of an impedance resulting from application of a voltage to the pair of electrodes peaks periodically according to the frequency of a signal to be inputted or outputted. In the past, there has been the following problem. In fabricating a band-pass filter (hereinafter abbreviated to "BPF" on occasion) by using a thin film capacitor in which the Q factor decreases monotonously with respect to frequencies as shown in FIG. 2, for example, a desired attenuation at low frequencies cannot be fulfilled without sacrificing the band-pass characteristic (loss). As contrasted with this, in the thin film capacitor of the invention, since the Q factor has periodic peaks that depend upon the frequency of a signal to be inputted or outputted, it follows that, in fabricating a BPF therewith, a higher attenuation can be attained by ensuring that the peak value will stand at a low-frequency level without adjusting a circuit constant, thereby satisfying the requirements. That is, a higher attenuation can be attained at low frequencies without sacrificing the band-pass characteristic (loss), whereby making it possible to produce a BPF that is excellent in band-pass characteristic.

Moreover, in the invention, the signal frequency (usable frequency) is adjusted to fall in between the values representing the adjacent peaks of the impedance phase characteristic. This makes it possible to provide a thin film capacitor in which Q factor reduction resulting from voltage application can be minimized at a predetermined frequency. By using such a thin film capacitor, it is possible to realize a variable filter or the like with low insertion loss and little phase characteristic variation.

Further, in fabricating a capacitor, how high its Q factor can be made depends upon a combination of various factors including materials to be used; material composition; film property; and film thickness, of which each is associated with a dielectric thin film, and also materials to be used and film thickness that are associated with an electrode. Essentially, a paraelectric substance is preferably used as a dielectric material. In the alternative, considering various requirements to be satisfied by a capacitor, a material derived from a paraelectric-ferroelectric phase transition boundary may be used as desired. In this case, there is a necessity to set parameters for adjusting the usable frequency to fall in between the values representing the adjacent resonant frequencies as described above. Otherwise, when piezoelectricity-induced resonance takes place by voltage application, it is likely that the Q factor will be sharply decreased under the influence of the resonance after voltage application. According to the invention, even if such a thin film material as has a high dielectric constant is used, it is possible to attain a high Q factor irrespective of voltage application.

In the invention, it is preferable that the dielectric layer is made of a perovskite-type oxide dielectric substance, and also that the dielectric layer is made of $(Ba, Sr) TiO_3$.

According to the invention, by using such dielectric layers, it is possible to realize a variable capacitor having a high dielectric constant, in which the dielectric constant may vary greatly by a voltage applied externally.

In the invention, it is preferable that an insulating layer is so formed as to cover the pair of electrodes and the dielectric layer.

According to the invention, the insulating layer allows insulation between the pair of electrodes and reduction of a parasitic capacitance present therein.

In the invention, it is preferable that the pair of electrodes each have an electrode terminal, and that a protective layer is formed in such a way that part of the electrode terminal is exposed.

According to the invention, the pair of electrodes and the dielectric layer are mechanically protected by the protective layer from external perturbations. Besides, the protective layer gives protection against material degradation due to a chemical reaction with humidity or oxygen; contamination due to deposition of foreign objects such as dust; quality deterioration due to breakage caused by mounting; contamination due to a chemical agent or the like; and oxidation.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention are described below.

Figure 5:
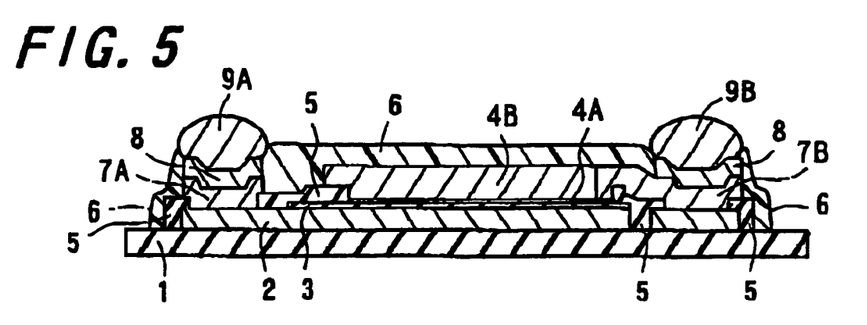
FIG. 5 is a sectional view of assistance in explaining one example of a thin film capacitor according to the invention.

In FIG. 5, the thin film capacitor includes a supporting substrate 1; a lower electrode layer 2; a dielectric layer 3; upper electrode layers 4A and 4B; an insulating layer 5; a protective layer 6; terminal electrode layers 7A and 7B; a solder spread inhibiting layer 8; and solder terminals 9A and 9B. The dielectric layer 3 is held between the lower electrode layer 2 and the upper electrode layers 4A and 4B. This part, namely, the area where the lower electrode layer 2 and the upper electrode layers 4A and 4B are opposed to each other, is defined as a capacitance forming section. Application of such a capacitance forming section constituted by a high-dielectric-constant thin film is not limited to a variable capacitor. For example, it is equally applicable to a thin film capacitor designed for use in a decoupling capacitor or DRAM. In this construction, the phase characteristic of an impedance resulting from application of a voltage to a pair of electrodes (the upper electrode layers 4A and 4B and the lower electrode layer 2) peaks periodically according to the frequency of a signal to be inputted or outputted.

The peak refers to a point where the phase characteristic value is at its maximum. As the applied voltage is higher, the peak is greater in response to changes in the capacitance, and the phase characteristic value, now standing at approximately −90°, approaches 0°. Moreover, since a plurality of periodic peaks are under the influence of the dependence of the Q factor on frequencies in the electrode and the dielectric layer, there is a tendency that, as the frequency of a signal to be inputted or outputted is higher, the phase value is closer to 0°. Further, regarding the periodicity of the peaks, given the frequencies of the adjacent two peaks of fa and fb, respectively, then a value represented as: |fa−fb| falls within a range approximately from 0.1 to 1 GHz. Note that the periodicity was obtained at a rough estimate on the basis of an embodiment of the invention, and the above explanation was given to make a distinction between a phase peak and a noise peak.

According to the thin film capacitor of the invention, since the impedance phase characteristic varies periodically with respect to frequencies, it follows that, in fabricating a band-pass filter for example, a desired attenuation can be fulfilled simply by adjusting the values of periodic peaks of the impedance phase characteristic at a low-frequency level, without adjusting a circuit constant. In order to avoid Q factor reduction under the influence of the periodic variation, materials in use and layer configuration need to be carefully selected and adjusted. By doing so, the shape of the peak can be adjusted so that the range of usable frequencies may be limited to values falling in between the adjacent peaks.

<Substrate>

The supporting substrate 1 can be made of $Al_2O_3$; $SiO_2$; MgO; $LaAlO_3$; $SrTiO_3$; or the like. The supporting substrate 1 is preferably given appropriate flatness and surface roughness so as to impart evenness to the surface of the dielectric layer 3 formed on the substrate 1. Although there is no particular limitation to a material in use so long as it possesses insulation property, the supporting substrate 1 needs to be so configured that no excitation of a thickness-wise longitudinal vibration is induced by its thickness.

<Lower Electrode>

On the supporting substrate 1 is formed the lower electrode layer 2. As a conductor material to be used therefor, a metal having a low resistivity is needed from the viewpoint of attaining a high Q factor. Preferred examples thereof include copper; aluminum; gold; and silver. However, in the process of forming the dielectric layer 3 constituted by a high-dielectric-constant thin film on the lower electrode layer 2, depending on materials, the lower electrode layer 2 might spread toward or react with the high-dielectric-constant thin film in accompanying thermal history at high temperature. This gives rise to a problem of an undesirable increase in leak current. To avoid this problem, it is more desirable to use a material which is less prone to reaction and spread with respect to the high-dielectric-constant thin film, for example, platinum or palladium. Regarding the film thickness, the thinner the lower electrode layer 2 is made, the more likely it is that the resonant frequency will be shifted to a high-frequency level. This, however, depending on frequencies or materials having high resistance, may lead to a heavy loss involved in the electrode, in consequence whereof there results an undesirable decrease in the original Q factor before voltage application. Therefore, the film thickness needs to be determined with due consideration. The film thickness intended for the invention is determined in consideration of the entire film thickness, i.e. the sum of the thicknesses of the dielectric layer and the upper electrode layer, and the effective sonic velocity. The formation is carried out by a vapor phase synthesis method such as sputtering or vacuum deposition, followed by processing by photolithography and dry etching.

<Dielectric>

The dielectric layer 3 is preferably made of a material having a high dielectric constant, more preferably, a dielectric material whose dielectric constant varies greatly by external voltage application. For example, perovskite-type oxide such as $BaTiO_3$, $SrTiO_3$, and $(Ba, Sr) TiO_3$ are desirable. Such a material can be formed into the dielectric layer 3 by known thin film producing technique, for example, aqueous solution technique such as Sol-gel method; sputtering; CVD; laser ablation; MBE (Molecular Beam Epitaxy); or other vapor phase synthesis methods. For example, the dielectric layer 3 is so formed as to cover the surface of the lower electrode layer 2. After that, the remainder of the dielectric layer 3, apart from the capacitance forming section, is removed by wet etching. Regarding the thickness of the high-dielectric-constant thin film, as the film thickness is smaller, the fundamental wave is higher in frequency. Thus, obtaining as small a film thickness as possible is effective in getting rid of the influence at the usable frequency. Moreover, the smaller the film thickness, the greater the electric field intensity. Thus, a high tunability characteristic can be attained. However, improper thickness reduction may give rise to problems of an increase in leak current and a decrease in effective relative dielectric constant. Note that a piezoelectric constant depends upon materials in use, composition, and film property, and the size and sharpness of the peak varies often. The film thickness needs to be adjusted in consideration of these facts.

<Upper Electrode A>

The upper electrode A layer 4A is formed of a conductor material such as Au, Ag, Al, Cu, or Pt. The thickness thereof is, just as is the case with the lower electrode layer 2, determined in consideration of the electrode's own resistance; the entire film thickness; and the effective sonic velocity. The upper electrode A layer 4A is formed together with the lower electrode layer 2 and the dielectric layer 3 in the same batch without exposure to the air. In this way, the interface between adjacent layers can be protected from unwanted deposition of foreign objects including oils and fats; wherefore the adhesion can be improved. Moreover, since intrusion of water can be prevented, it is possible to attain significantly high moisture resistance and thereby provide stable characteristics.

<Insulating Layer>

The insulating layer 5, which is so formed as to cover the entire structure, is essential for providing insulation between the upper electrode B layer 4B and the lower electrode 2 and for decreasing a parasitic capacitance present therein. The insulating layer 5 is preferably made of an organic substance such as BCB or polyimide, or an inorganic substance such as $SiO_2$ or $Si_3N_4$, which is high in insulation and low in dielectric constant for minimizing the parasitic capacitance, although not restricted thereto. The formation is preferably carried out by CVD typified by MOCVD whereby to obtain a relatively uniform film thickness even if a primary coat has a complicated, undulating configuration. The insulating layer 5 is formed in pattern by etching with use of a photoresist as a mask so as to create an opening immediately above the upper electrode A layer 4A. It is preferable that another opening is concurrently created so as for the lower electrode 2 to be exposed on the upper surface of the capacitor.

<Upper Electrode B>

Subsequently, the upper electrode B layer 4B is formed that acts as the connection between the upper electrode A layer 4A and one of the terminal electrode layers, namely, the terminal electrode layer 7B. As a material to be used therefor, a low-resistant metal such as Au or Cu is desirable. Just as is the case with the upper electrode A layer 4A and the lower electrode layer 2, the material and film thickness of the upper electrode B layer 4B are determined in consideration of the electrode's own resistance; the entire film thickness; and the effective sonic velocity. Note that an adhesion layer made of Ti, Ni, or the like material can arbitrarily be added for the purpose of enhancing the adhesiveness between the upper electrode B layer 4B and the insultiave layer 5, so long as the resistance of the upper electrode B layer 4B, as well as the acoustic mass loading, should be kept small.

<Protective Layer>

Next, the protective layer 6 is formed in such a way that part of the lower terminal electrode layer 7A to be electrically connected to the lower electrode layer 2, as well as part of the upper terminal electrode layer 7B to be electrically connected to the upper electrode B layer, may be exposed. The protective layer 6 serves to protect the constituent elements mechanically from external perturbations. Besides, the protective layer 6 gives protection against material degradation due to a chemical reaction between humidity and oxygen; contamination due to deposition of foreign objects such as dust; quality deterioration due to breakage caused by mounting; contamination due to a chemical agent or the like; and oxidation. The requirements to be satisfied by a material to be used therefor are: high heat resistance; excellence in coatability for an undulating configuration; and freedom from excitation of unnecessary oscillation. Specifically, an organic thermosetting material such as BCB (benzocyclobutene) resin or a photo-curing material is usable.

<Terminal>

The solder spread inhibiting layer 8 is formed on each of the lower terminal electrode layer 7A and the upper terminal electrode layer 7B for the purpose of preventing solder from spreading toward the electrode during execution of reflow or mounting for the formation of the solder terminals 9A and 9B. The solder spread inhibiting layer 8 is preferably made of Ni. In order to gain enhanced wettability for solder, the solder spread inhibiting layer 8 may have its surface coated with a material exhibiting excellent wettability for solder, such as Au or Cu, in a thickness of approximately 0.1 µm, as desired. Lastly, the solder terminal portions 9A and 9B are formed to facilitate mounting. In general, the formation thereof is achieved by printing a solder paste, followed by performing reflow.

<Conclusion>

As described heretofore, according to the invention, the thin film capacitor is composed of a pair of electrodes and a dielectric layer exhibiting piezoelectricity sandwiched therebetween. In this construction, the phase characteristic of an impedance resulting from application of a voltage to the pair of electrodes peaks periodically according to the frequency of a signal to be inputted or outputted. Moreover, the frequency of the signal is adjusted to fall in between the values representing the adjacent peaks. Accordingly, the thin film capacitor of the invention can be used as part of a resonant circuit (a capacitance component of an LC resonant circuit) of a high-frequency component, or as a capacitance component for coupling the resonant circuit. The thin film capacitor also finds applications in various high-frequency components including a voltage-controlled high-frequency resonant circuit component, and, as a complex unit provided for the resonant circuit, a voltage-controlled high-frequency filter, a voltage-controlled matching circuit element, and a voltage-controlled thin film antenna duplexer.

EXAMPLE

As an example embodying the invention, a variable capacitor was fabricated that is operable at a frequency of approximately 1.9 GHz. In order to avoid Q factor reduction resulting from resonance at the usable frequency of 1.9 GHz, layer configuration, materials, and film thickness were determined as follows.

On a sapphire-made R substrate acting as a supporting substrate were formed a 2 μm-thick lower electrode of Pt; a 0.38 μm-thick dielectric layer of a $(Ba_{0.5} Sr_{0.5}) TiO_3$; and a 0.2 μm-thick upper electrode of Pt successively by means of sputtering, with the temperature of the substrate set at 600° C. Then, using photolithography, the electrodes and the dielectric layer were subjected to patterning by dry etching and wet etching. On the high-dielectric-constant thin film with the upper electrode was formed an insulating layer made of amorphous silicon dioxide by the plasma CVD method. Subsequently, a resist film was coated over the entire surface. Using photolithography, a rectangular hole was drilled in the photoresist film, and then the insulating layer located on the upper electrode was selectively removed by reactive ion etching with use of the photoresist film as a mask, thereby achieving opening of the rectangular hole for taking out an electrode terminal.

Thence, a 2 μm-thick extraction electrode Au was formed, with the temperature of the substrate set at 300° C., followed by performing patterning thereon. The extraction electrode Au is electrically connected to each of the upper and lower electrodes. On the extraction electrode Au was formed a 2 μm-thick protective layer made of photosensitive benzocyclobutene resin by the spin-coat method, followed by performing patterning thereon so as to create an opening. Next, a pair of electrode terminals were fabricated.

In this embodiment, at first, Au, Ni, and again Au were successively applied to the extraction electrode exposed at the opening by means of vapor deposition, thereby obtaining a triple-layer metal film. Then, using photolithography, an unnecessary part was removed, with the rectangular hole for taking out the electrode terminal and its environs left intact. Thereupon, a pair of electrode terminals were realized.

In this way, the lower electrode and one of the electrode terminals were electrically connected to each other, while the upper electrode and the other electrode terminal were electrically connected to each other. Note that, in the invention, the above-described Au—Ni—Au triple-layer structure is employed by reasons of the adhesiveness improving effect of Au; the spread inhibiting effect of Ni acting as a barrier layer; and the surface-oxidation preventing effect and excellent wettability for solder of Au. However, the invention is not limited thereto. For example, Ti may be used as a metal material which serves the purpose of improving adhesiveness, and Cu may be used as a barrier layer, instead. Lastly, a solder bump was formed of lead-free solder by the printing and reflow methods. Thereupon, a desired variable capacitor was realized.

Figure 6:
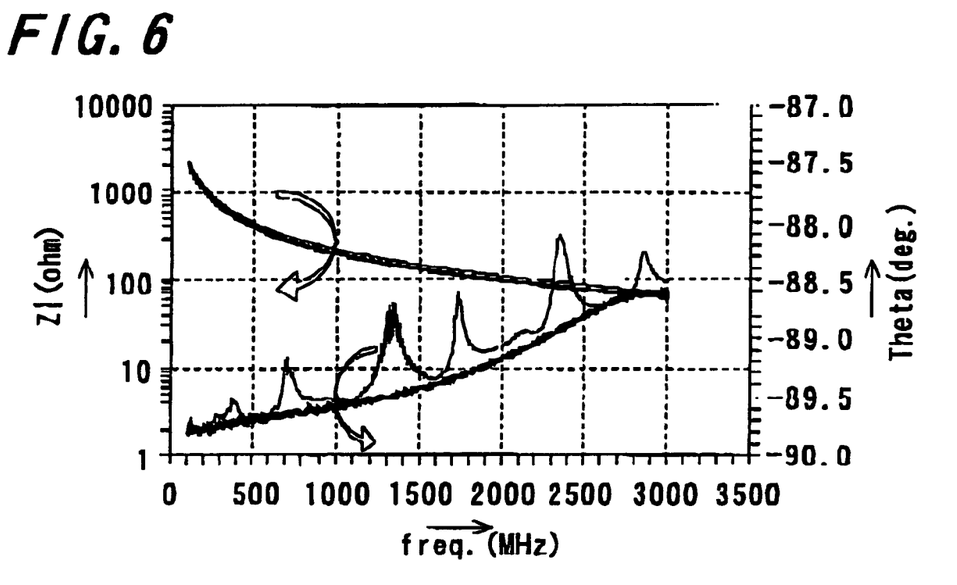
FIG. 6 is a plot showing frequency dependence of phase characteristics as seen in the invention.
Figure 7:
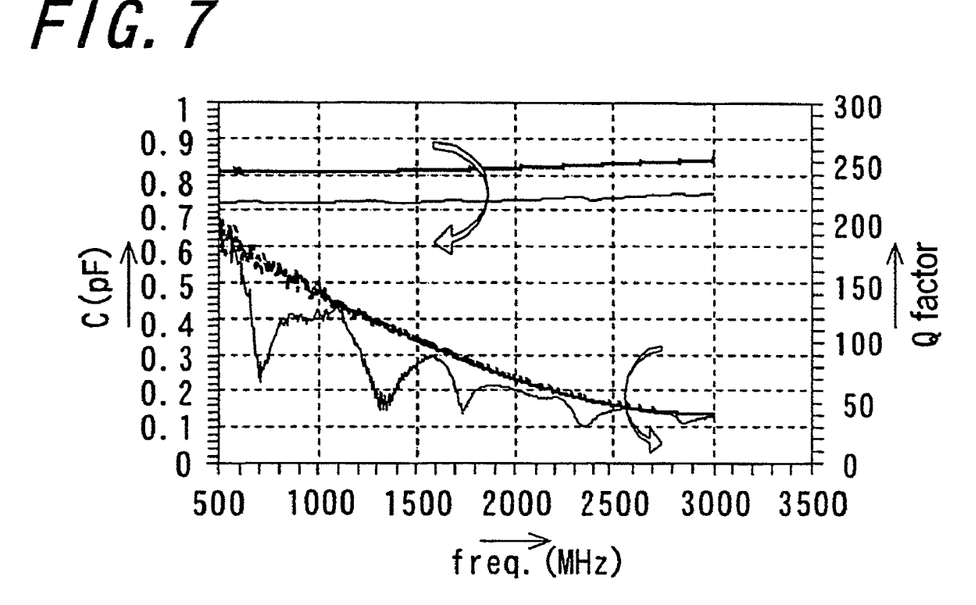
FIG. 7 is a plot showing frequency dependence of Q factors as seen in the invention.

The results of impedance measurement conducted on the variable capacitor thus fabricated are shown in FIGS. 6 and 7 that indicate phase characteristics and Q factors, respectively, as observed before and after voltage application. For impedance measurement, Impedance analyzer (:E4991A manufactured by Agilent technologies, Inc.) and Test fixture (:16197A manufactured by Agilent technologies, Inc.) were used. In these figures, the phase characteristic and Q factor before voltage application are represented by a thick line, whereas the phase characteristic and Q factor after voltage application are represented by a thin line. At the desired frequency of approximately 1.9 GHz, the resonance peaks greatly at 1.73 GHz and at 2.36 GHz, yet peaks slightly at 2.14 GHz. That is, by determining layer materials, film thickness, or other factors properly as achieved in the above-described embodiment, it is possible to realize a variable capacitor embodying the invention in which the usable frequency stands at a value of 1.9 GHz that falls in between the adjacent peaks of a plurality of resonance peaks. In terms of Q factor, there is sharp reduction at about the resonant frequency. By contrast, Q factor reduction can be minimized at 1.9 GHz before and after voltage application.

Figure 1:
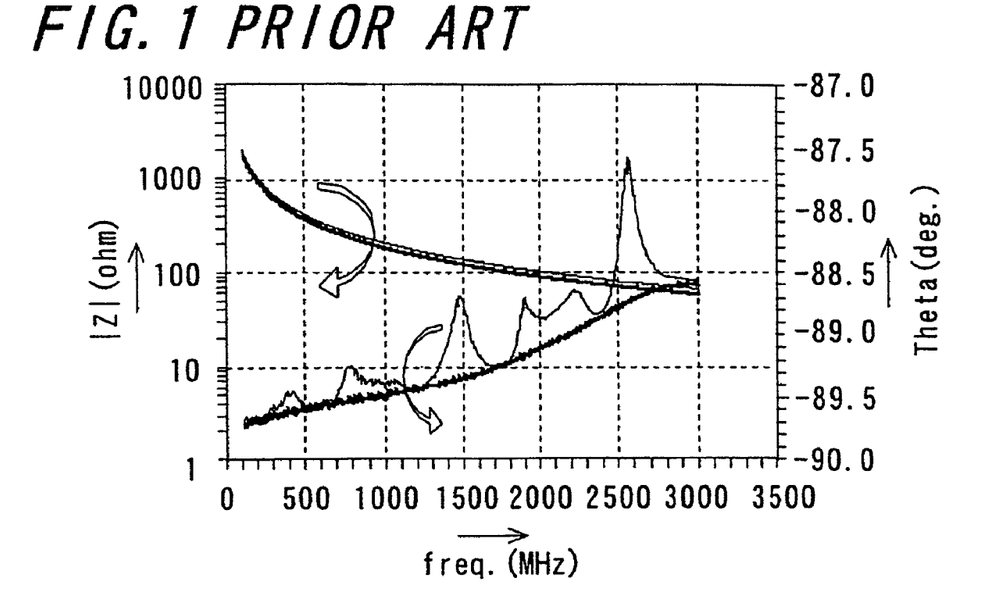
FIG. 1 is a plot showing frequency dependence of phase characteristics as seen in a related-art practice, for comparison with the invention.
Figure 2:
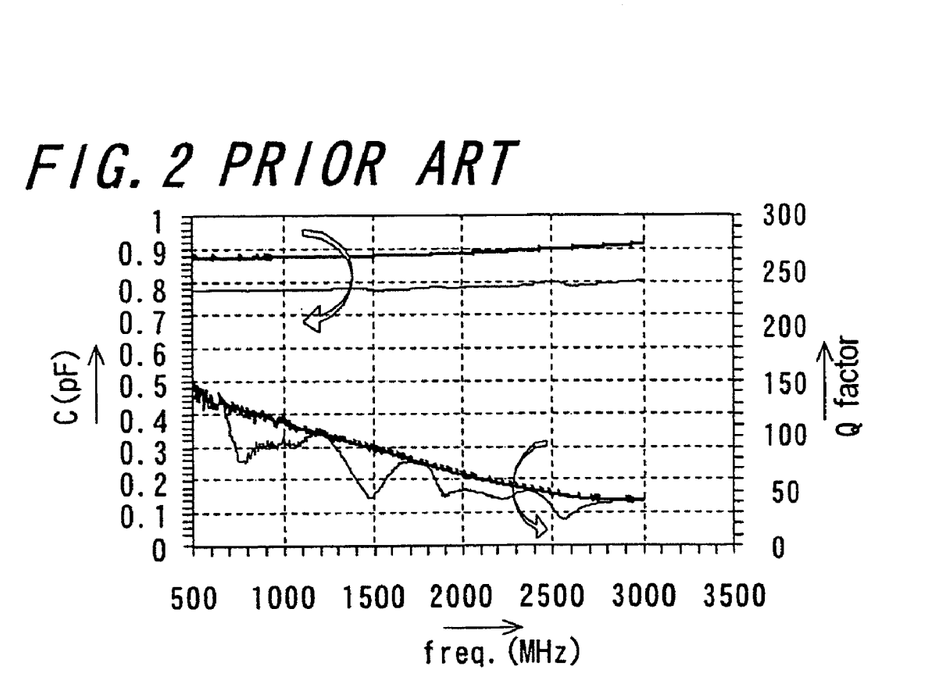
FIG. 2 is a plot showing frequency dependence of Q factors as seen in the related-art practice, for comparison with the invention.

For purposes of comparison, FIGS. 1 and 2 show the results of measurement conducted on another variable capacitor which is operable at 1.9 GHz. This variable capacitor pays no regard to the setting as achieved in the embodiment of the invention. As will be understood from the after-voltage-application phase characteristic (thin line) shown in FIG. 1, the resonant frequency stands at approximately 1.9 GHz. Correspondingly, there is sharp Q factor reduction at the desired frequency of 1.9 GHz under the influence of the resonance. By comparison on the basis of specific Q factors, in the construction in which no setting was made, the Q factor is reduced from 68 to 47 after voltage application, the difference being as great as about 20. By contrast, in the embodiment in which the setting as to layer configuration and film thickness was made properly, the before-voltage-application Q factor was 74, whereas the after-voltage-application Q factor was 64, the difference being as small as about 10.

It should be understood that the forms of the invention described above are illustrative only and are not intended to limit the scope of the invention, and accordingly a variety of modifications and changes may be made in the invention without departing from the spirit of the invention. For example, in the embodiment, the Q factor reduction of about 10 occurring after voltage application is ascribable to the influence of the small resonance at 2.14 GHz. Although the reduction is sufficiently small, further suppression or elimination of Q factor reduction may be possible.

Essentially, the piezoelectricity of a BST-base material such as shown herein is defined by a small piezoelectric constant, and the capacitor is not subjected to acoustic isolation. Thus, its phase characteristic variation is slight as compared with a piezoelectric thin film resonator which shows considerable phase variation. Given this fact, periodic Q factor reduction resulting from phase characteristic variation can be confirmed only when a high Q factor is attained. In a high-frequency region of approximately a few GHz band in particular, a high Q factor cannot be attained without reducing a loss involved in an electrode and a dielectric loss in a high-dielectric-constant thin film. The bottom line is that the periodic Q factor reduction occurring in such a variable capacitor after voltage application has been confirmed by virtue of the diligent efforts expended by the inventors of the present application to obtain as high a Q factor as possible in a high-frequency region, and accordingly the invention has been accomplished on the basis of the finding.

Hereupon, according to the thin film capacitor of the invention, a voltage application causes such a change that the phase characteristic has a plurality of periodic peaks with respect to a frequency, and also the usable frequency is adjusted to fall in between the values representing the adjacent peaks of a plurality of peaks. Thus, it never occurs that the before-voltage-application Q factor is greatly reduced under the influence of resonance after voltage application at the usable frequency. As a result, a high Q factor can be attained in the variable capacitor employing a high-dielectric-constant thin film irrespective of voltage application.

Moreover, according to the thin film capacitor of the invention, even if a high-dielectric-constant thin film material having a slight piezoelectricity is used to satisfy many requirements other than a desired Q factor, it is possible to realize a thin film capacitor in which a high Q factor can be attained irrespective of voltage application.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A thin film capacitor comprising:
   a pair of electrodes; and
   a dielectric layer sandwiched between the electrodes,
   wherein a phase characteristic of an impedance resulting from voltage application to the pair of electrodes peaks periodically according to a frequency of a signal to be inputted or outputted and the frequency of the signal (usable frequency) is adjusted to fall in between values representing adjacent peaks and,
   wherein a resonant frequency fn is given by: $fn=nV/2t$ ($n=1, 3, 5 \ldots$), in which t is an entire film thickness, defined as the sum of the thicknesses of the dielectric layer and the pair of electrodes for constituting a piezoelectricity-influenced oscillatory portion, and V is an effective sonic velocity of a sonic wave propagating through the oscillatory portion, and the resonant frequency is so adjusted as not to fall within the range of the signal frequencies.

2. The thin film capacitor of claim 1, wherein the dielectric layer is made of a perovskite-type oxide dielectric substance.

3. The thin film capacitor of claim 1, wherein the dielectric layer is made of $(Ba, Sr)TiO_3$.

4. The thin film capacitor of claim 1, wherein an insulating layer is so formed as to cover the pair of electrodes and the dielectric layer.

5. The thin film capacitor of claim 1, wherein the pair of electrodes each have an electrode terminal, and a protective layer is formed in such a way that part of the electrode terminal is exposed.

* * * * *